United States Patent
May

(10) Patent No.: US 7,412,608 B2
(45) Date of Patent: Aug. 12, 2008

(54) SECURE DATA PROCESSING UNIT, AND AN ASSOCIATED METHOD

(75) Inventor: Christian May, München (DE)

(73) Assignee: Infineon Technologies AG, Neubiberg (DE)

( * ) Notice: Subject to any disclaimer, the term of this patent is extended or adjusted under 35 U.S.C. 154(b) by 904 days.

(21) Appl. No.: 10/302,205

(22) Filed: Nov. 22, 2002

(65) Prior Publication Data

US 2003/0110390 A1    Jun. 12, 2003

Related U.S. Application Data

(63) Continuation of application No. PCT/DE01/01693, filed on May 4, 2001.

(30) Foreign Application Priority Data

May 22, 2000    (EP) ................................. 00110838

(51) Int. Cl.
*G06F 11/30* (2006.01)
(52) U.S. Cl. ........................................... 713/194; 380/1
(58) Field of Classification Search ................ 713/194, 713/193; 380/1; 726/26
See application file for complete search history.

(56) References Cited

U.S. PATENT DOCUMENTS

| | | | |
|---|---|---|---|
| 3,812,475 A | * | 5/1974 | Christiansen et al. ........... 710/7 |
| 4,630,120 A | * | 12/1986 | Childs ........................ 348/106 |
| 5,086,467 A | * | 2/1992 | Malek ......................... 380/252 |
| 5,682,272 A | * | 10/1997 | Taroda et al. .................. 360/53 |
| 5,884,025 A | * | 3/1999 | Baehr et al. .................... 726/13 |
| 5,896,325 A | * | 4/1999 | Fujioka .................... 365/189.07 |

(Continued)

FOREIGN PATENT DOCUMENTS

| DE | 199 36 939 A1 | 4/2000 |
|---|---|---|
| EP | 0 404 559 A2 | 12/1990 |

(Continued)

OTHER PUBLICATIONS

User's Guide: "Section 1: Introduction, Data Book Soft Microcontroller", Oct. 6, 1993, pp. 1-3,7-8,73,77-80,82,229,290-292, XP-002020287.*

(Continued)

*Primary Examiner*—Gilberto Barron, Jr.
*Assistant Examiner*—Fikremariam Yalew
(74) *Attorney, Agent, or Firm*—Dickstein Shapiro LLP

(57) ABSTRACT

A secure data processing unit has a data/program instruction memory for storing data/program instructions, an instruction line with a large number of function stages for processing the data/program instructions, and a control unit for controlling the function stages. A blank function generator in this case randomly produces blank functions in the data processing unit, thus making an eavesdropping attack by analysis of leakage information considerably more difficult or preventing it.

22 Claims, 2 Drawing Sheets

U.S. PATENT DOCUMENTS

| | | | | |
|---|---|---|---|---|
| 5,944,833 A | * | 8/1999 | Ugon | 713/400 |
| 6,161,169 A | * | 12/2000 | Cheng | 711/150 |
| 6,304,658 B1 | | 10/2001 | Kocher et al. | |
| 6,408,075 B1 | * | 6/2002 | Ohki et al. | 380/28 |
| 6,615,354 B1 | * | 9/2003 | Ohki et al. | 713/193 |
| 6,718,414 B1 | * | 4/2004 | Doggett | 710/267 |
| 6,839,847 B1 | * | 1/2005 | Ohki et al. | 713/194 |
| 6,873,706 B1 | * | 3/2005 | Miyazaki et al. | 380/30 |
| 2003/0005206 A1 | | 1/2003 | Kniffler | |

FOREIGN PATENT DOCUMENTS

| | | |
|---|---|---|
| EP | 1 118 924 A1 | 7/2001 |
| WO | WO 99/35782 | 7/1999 |

OTHER PUBLICATIONS

H.D.L. Hollmann et al.: "Protection of software algorithms executed on secure modules", *Future Generation Computer Systems, No. 13, 1997, pp. 55-63.*

User's Guide: "Section 1: Introduction, Data Book Soft Microcontroller", *Oct. 6, 1993, pp. 1-3, 7, 8, 73, 77-80, 82, 229, 290-292, XP-002020287.*

* cited by examiner

SECURE DATA PROCESSING UNIT, AND AN ASSOCIATED METHOD

CROSS-REFERENCE TO RELATED APPLICATION

This application is a continuation of copending International Application No. PCT/DE01/01693, filed May 4, 2001, which designated the United States and was not published in English.

BACKGROUND OF THE INVENTION

Field of the Invention

The present invention relates to a secure data processing unit and to an associated method, and in particular to a secure data processing unit as well as an associated method, which protects cryptographic encryption and/or access authorization against impermissible external eavesdropping attacks.

The increasingly widespread use of, for example, cryptographic systems for electronic encryption of security-relevant data and/or for electronic access authorization in security-relevant areas has resulted in an increasing requirement for secure data processing units which, in particular, are protected against external attacks such as eavesdropping.

Most cryptographic systems require secure handling of the keys that are used for cryptographic processing. In secure systems with so-called public keys, the associated private keys must be protected in such a way that possible attackers can never read or decipher the key or keys since otherwise digital signatures (for example) may be corrupted, data may be modified and secret information may be deciphered.

Essentially, a distinction is in this case drawn between symmetrical and asymmetric algorithms and/or cryptographic protocols by which an undesired data attack on confidential or secret data can be prevented.

By way of example, cryptographic coding apparatuses for implementation of encryption and/or access authorization must securely protect the secret keys even when they are located in an environment in which they can be attacked. By way of example, so-called chip cards, smart cards or security-relevant modules are known as cryptographic coding apparatuses of this type with associated data processing units, and, for example, allow protected access authorization and/or protected encryption of data for cash dispensers, motor vehicle immobilizers, etc.

SUMMARY OF THE INVENTION

It is accordingly an object of the invention to provide a secure data processing unit, and an associated method that overcome the above-mentioned disadvantages of the prior art devices and methods of this general type, which reliably prevents external eavesdropping attacks without modification to cryptographic programs.

With the foregoing and other objects in view there is provided, in accordance with the invention, a secure data processing unit. The data processing unit contains a data/program instruction memory for storing data/program instructions, at least one instruction line having a large number of function stages for processing the data/program instructions and is connected to the data/program instruction memory, a control unit connected to the instruction line for controlling the large number of function stages, and a blank function generator for producing blank functions and connected to the control unit, the instruction line or the data/program instruction memory.

In particular, the use of the blank function generator for producing blank functions in the data processing unit and, if necessary, a blank function compensator in order to compensate for the blank functions which are produced in the data processing unit results in de-synchronization of the instruction or command sequence for different initial data of a respective cryptographic decryption process. This reliably makes it possible to prevent trigger points in the current profiles of the data processing unit from being found, thus making more difficult or preventing current profile analysis by resynchronization of the time profile of data records.

The blank function compensator preferably prevents write processes to register/memory locations which can be used by programs, thus resulting in particularly simple compensation for the blank functions that are produced, and not causing any influence on an effective program flow.

In order to improve protection against external attacks, the blank function generator can produce blank instructions in the form of permissible program instructions. In this case it is particularly difficult to detect the blank instructions.

Alternatively or additionally, the blank function generator may have a blank sequence generator that, in addition to required function stages, activates unused function stages in an instruction line. This makes it impossible to draw any conclusions about a respective instruction being processed by activation leakage information (currents) from respective function stages.

In a similar way, additionally or alternatively, the blank function generator may have a blank read/write generator for producing additional read/write processes to high-speed data/program instruction buffer stores, thus making it possible to render unusable leakage information, which is particularly simple to detect, from a memory bus.

Random control for random driving of the blank function generator may in this case be really random and pseudo-random (deterministic) and may optionally have the capability to be switched on and off.

In accordance with an additional feature of the invention, the blank functions are produced inherently and have no effect on a desired program sequence.

In accordance with an added feature of the invention, the blank function compensator is a part of the control unit and, for the blank functions, directly prevents write processes in the secure data processing unit. Alternatively, the blank function compensator is part of the control unit and has register/memory locations that cannot be used by programs, and in which, for the blank functions, write processes in the secure data processing unit are made to the register/memory locations that cannot be used.

In accordance with another feature of the invention, the blank function generator has a blank instruction generator for producing blank instructions.

In accordance with a further feature of the invention, the blank function generator derives a permissible program instruction from the program instructions that are actually processed.

Other features which are considered as characteristic for the invention are set forth in the appended claims.

Although the invention is illustrated and described herein as embodied in a secure data processing unit, and an associated method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
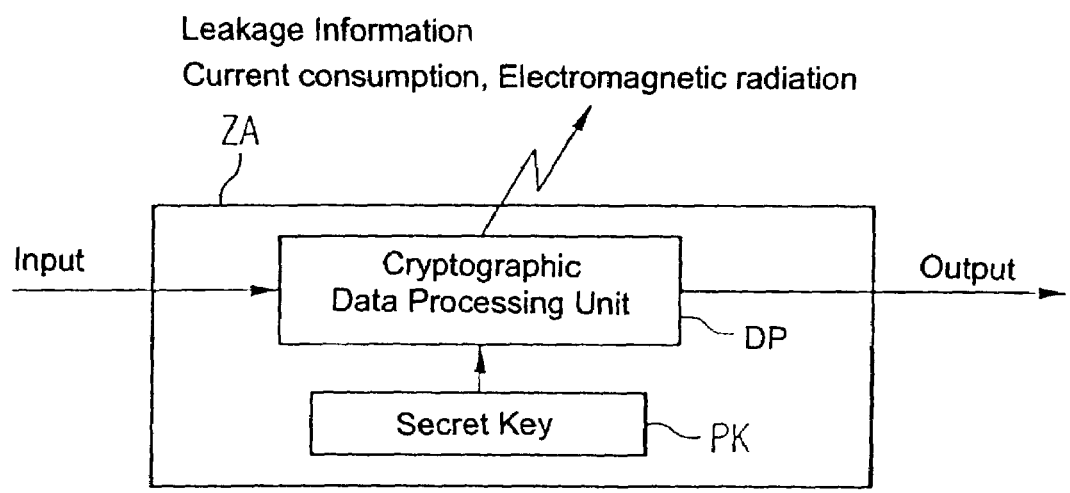
FIG. 1 is a block circuit diagram of an attack via leakage information analysis according to the prior art.

Referring now to the figures of the drawing in detail and first, particularly, to FIG. 1 thereof, there is shown a diagrammatic illustration of a coding apparatus or of an automatic state device ZA for providing, for example, cryptographic encryption and/or access authorization, which essentially contains a cryptographic data processing unit DP and which cryptographically processes an input, or entered data, using, by way of example, a secret key PK (private key). The data processed by the data processing unit DP is then emitted at an output, thus providing cryptographic encryption and/or protected access authorization.

The automatic state device ZA illustrated in FIG. 1 is, for example, in the form of a chip card, smart card, protected microprocessor unit or the like. In consequence, the cryptographic coding apparatus ZA uses the secret key PK for processing entered information and for outputting and/or producing information, with the cryptographic algorithms and/or protocols normally being configured such that it is possible to protect against an attack on the data to be encrypted or secret data at the input or output interface.

However, it has been found that considerably more effective external attacks on cryptographic data processing units and/or on the coding methods that are processed in them, and on their secret keys, can also take place via so-called leakage information. As shown in FIG. 1, this is, for example, current consumption, an electromagnetic radiated emission or the like, which, with regard to cryptographic data processing, allow conclusions to be drawn about the secret keys being used and/or about the cryptographic method being used.

The present invention in this case relates in particular to an attack by so-called statistical analysis of physical signals such as a current profile of the data processing unit DP. Analysis of a current profile of the data processing unit DP in this case makes use of the fact that integrated circuits contain a large number of individual transistors that essentially operate as voltage-controlled switches. In this case, for example, current flows via a transistor substrate as soon as charges are applied to or removed from a gate. This current in turn supplies charges to the gates of further transistors, as a result of which, in turn, further wiring sections or loads are switched. Such a switching behavior, which is also carried out in particular when processing cryptographic algorithms, can thus be measured via the current supply to the data processing unit DP or to the automatic state device ZA, and makes it possible for attackers, for example, to read the secret key PK.

The best known current profile analysis methods are, in this case, simple current profile analysis (simple power analysis (SPA)), differential current profile analysis (differential power analysis (DPA)), and higher-order differential current profile analysis (high-order differential power analysis HO-DPA). While simple current profile analysis SPA is essentially based on visual monitoring of the fluctuations in the current consumption, attacks by differential current profile analysis DPA use statistical analysis methods as well as error correction methods for extraction of information that is correlated with secret keys. Higher-order differential current profile analyses (HO-DPA) improve the capabilities of an attack for extraction of secret keys by a measurable current consumption, although differential current profile analysis is in most cases itself sufficient to "monitor" the data being processed.

In order to prevent such attacks on data processing units in security-relevant fields of operation, International Patent Disclosure WO 99/35782, corresponding to U.S. Pat. No. 6,304,658, for example, discloses a cryptographic method and a cryptographic apparatus, by which a current profile analyses are rendered ineffective. Essentially, the document describes a method and an apparatus, in which leakage information that can be read by an attacker is, so to speak, deleted in a "self-healing" manner by continuously changing the steps that are essential for cryptographic data processing. In particular, this prevents statistical evaluations and reliably prevents any attack via, for example, the current consumption of a data processing unit DP, or via electromagnetic radiated emission.

An implementation such as this for attack protection has the disadvantage, however, that major changes must be made to the cryptographic software of the system and/or to the associated data processing unit. To be more precise, such protection can be carried out only if the respective cryptographic algorithms and/or protocols that need to be modified, or possibly autonomously changed, are known. Such a change to the direct software for cryptographic data processing involves an extraordinary amount of complexity, however, furthermore can be carried out only by experts, and is often not desired by respective users (customers) since such a manufacturer once again knows how to break the protection.

As a further option for preventing such attacks, it is also possible to use so-called additional current profile generators, which superimpose an interference current profile on a current profile which can be used for current profile analysis, and thus at least prevent simple current profile analysis. However, this does not provide protection against differential current profile analysis or higher-order current profile analysis.

Figure 2:
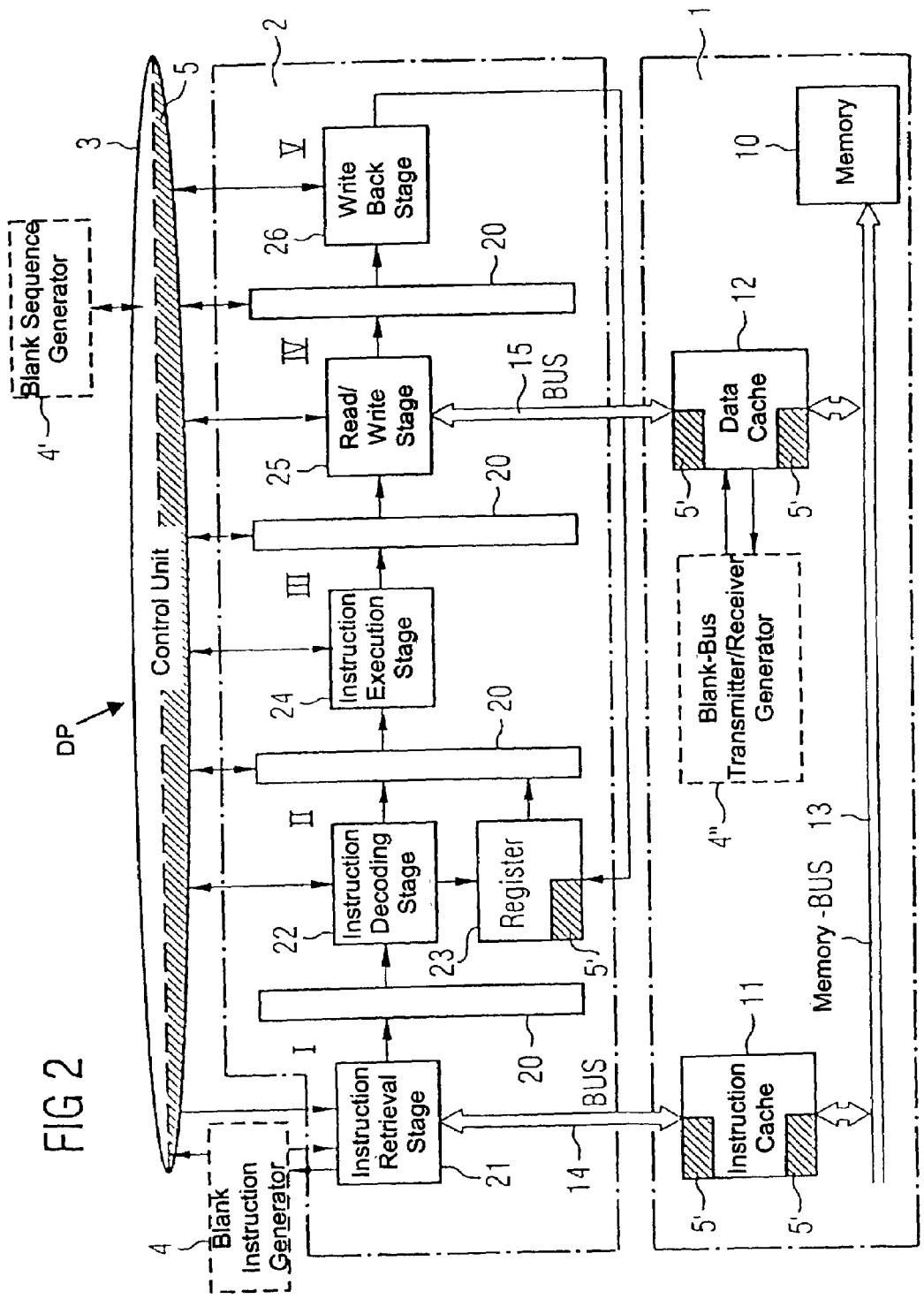
FIG. 2 is a block circuit diagram of a part of a secure data processing unit according to the invention.

FIG. 2 shows a simplified block diagram of a part of a secure data processing unit DP, according to the invention, in which, for simplicity, a large number of further major parts of the secure data processing unit are not shown.

That part of the secure data processing unit DP according to the invention that is illustrated in FIG. 2 essentially has a data/program instruction memory 1 for storing data and program instructions. As shown in FIG. 2, the data/program instruction memory 1 has a high-speed program instruction buffer store or instruction cache 11, and a high-speed data buffer store or cache 12, which are connected via a memory bus 13 to a conventional (slow access) memory 10.

The secure data processing unit furthermore has at least one instruction line or pipeline 2 with a large number of function stages or pipeline stages I to V for processing the data/program instructions. The high-speed data/program instruction buffer stores 11 and 12 are in consequence used for bus matching between the instruction line 2 and the memory 10. As shown in FIG. 2, the instruction line 2 has an instruction retrieval stage 21, by which program instructions are retrieved successively from the memory 10 via an instruction bus 14 and the high-speed program instruction memory 11. The program instructions are then supplied via a buffer store 20 to an instruction decoding stage 22, with a control unit 3 receiving associated control information at the same time. The control unit 3 is used essentially for controlling the large number of function stages I to V in the instruction line 2, and controls the processing of the retrieved program instruction via further function stages.

By way of example, the control unit 3 may arrange an addition of registers 23 from the function stage II via a further buffer store 20 in a downstream instruction execution stage 24. Once the result of the addition process has been passed on via a further buffer store 20 to a read/write stage 25, the control unit 3 may issue an instruction to load a value at an address of the calculated result from the memory 10 via a data bus 15 and the high-speed data buffer store 12. Furthermore, for certain functions, this result may be written back to the register 23 in the function stage II for renewed processing via a further buffer store 20 and a write back stage 26. The buffer stores or registers 20 are in this case used for decoupling the respective processing or function stages I to V, thus allowing simultaneous processing of data/program instructions in the respective stages.

Since both a program instruction and data processing in each of the function stages as well as data/program instruction transport via one of the buses 13, 14 and 15 lead to characteristic (optical, electrical, electromagnetic) leakage signals which can be evaluated, the signals can be detected and analyzed by the SPA and DPA attacks, as described above. A DPA attack is in this case based essentially on time correlation analysis between the program code that is being executed and the associated profile of the leakage signal, by which it is possible to deduce data secrets that are being processed. The correlation is in this case determined over a large number of measurements.

In order to prevent such a DPA attack or correlation analysis, the secure data processing unit according to the invention has a leakage function generator for producing blank functions and, if required, a blank function compensator for subsequent compensation for the blank functions that are produced in the data processing unit.

According to a first exemplary embodiment, the blank function generator is provided by a blank instruction generator 4 which produces blank instructions and introduces them directly into the instruction retrieval stage 21. In the simplest case, so-called NOP instructions (no operation) or wait-state instructions may be introduced in this case, although this results in the problem that instructions such as these can easily be identified on the basis of their characteristic leakage signal, and can be filtered out. Permissible program instructions are therefore preferably produced by the blank instruction generator 4, such as those that may also occur in the program code being executed. The blank instruction generator 4 produces the dummy or blank instructions by a non-illustrated random number generator or deterministically. Furthermore, the blank instructions can be produced by buffer storage of program instructions that actually need to be processed from the instruction retrieval stage 21, and are included once again, at a later time, randomly or deterministically at the instruction retrieval stage 21.

A blank instruction produced in this way is thus processed by the instruction line 2 or the data processing unit in the same way as a permissible program instruction. In consequence, it also produces similar leakage signals to those of the program instructions, thus reliably preventing correlation analysis. However, in order to prevent the inserted blank instructions from having any influence on the actual program processing, the blank instruction generator 4 informs the control unit 3 that the blank functions being produced may need to be compensated for. To be more precise, a blank function compensator 5, which is located in the control unit 3, prevents write processes to register/memory locations that can be used by programs for each blank instruction. This reliably precludes the results of the desired program processing being influenced by the inserted blank instructions.

The prevention of write processes to register/memory locations which can be used by programs may in this case be implemented directly by the blank function compensator 5, by the respective data/program instructions being rejected immediately before being written to a register/memory location. Alternatively, the prevention of write processes to register/memory locations which can be used by programs may be provided by additional unusable register/memory locations 5', which are written to when blank instructions occur, but are not used or evaluated by the desired program processing. These unusable register/memory locations 5' are located, for example, in the register 23 and in the high-speed data/program instruction buffer stores 11 and 12. However, they are not restricted to this and may also be located at any other point in the secure data processing unit.

However, there is no need to provide compensation for certain commands (for example NOP) that inherently do not change the program state. Particularly in the case of a blank function that represents the addition of the value "0", there is no need for compensation since, despite producing an "addition" leakage signal, no influence on the program takes place and it is very difficult to filter out the blank function.

According to a second exemplary embodiment, the blank function generator is formed by a blank sequence generator 4', which activates at least one additional function stage which is not required in the instruction line 2. The blank sequence generator 4' described in the following text may in this case be operated either on its own or in combination with the blank instruction generator 4 described above. In order to avoid repetition with regard to the method of operation of the blank function compensators 5 and 5' reference should in this case be made to the description of the first exemplary embodiment.

In general, there is no need to provide compensation for a blank function. For example, an addition of 0 can be carried out as a blank instruction, with the result being passed to the next stage, in the instruction execution stage, instead of just passing on a data item.

According to the present second exemplary embodiment, it is possible during the processing of instructions in the desired program code in the instruction line 2 for stage elements in the instruction line 2 not to be required for a predetermined instruction. For example, a result of an operation in the read/write stage 25 can be written to the high-speed data buffer store 12 or, alternatively, via the write back stage 26 to the register 23. In order to make it impossible to distinguish between two such different instructions by a DPA attack, the blank sequence generator 4' also activates those function stages that are not required for the actual program processing. This thus results in the same activation leakage signals for all program instructions. As an alternative, however, it is also possible to activate selectively only individual unused function stages in a respective instruction line 2, thus resulting in a further improvement in decorrelation and/or decoherence.

The blank sequence generator 4' may in this case once again be driven purely randomly or deterministically. The instruction line 2 is preferably controlled by a control line from the control unit 3, or by additional information that is transmitted on the buses.

According to a third exemplary embodiment, the blank function generator is formed by a blank bus transmission/reception generator 4", which produces additional read/write processes to the bus interface function blocks, such as the high-speed data/program instruction buffer stores 11 and 12. The blank bus transmission/reception generator 4" which is described in the following text may in this case be operated either on its own or in conjunction with the blank instruction generator 4 and blank sequence generator 4' as described above. In order to avoid repetition of the method of operation of the blank function compensators 5 and 5', reference should in this case be made to the description of the first exemplary embodiment.

There is no need to provide compensation for a blank bus transmission instruction if the transmission instruction is ignored by all the connected bus interface function blocks, such as the memory 10 or read/write stage 25.

According to the present third exemplary embodiment, a transmission/reception process or read/write process for a data item or program instruction need not necessarily lead to a read/write process in the memory 10 but may, for example, be completed by reading/writing a corresponding element in the high-speed data buffer store 12. The read/write process to the memory 10 from the high-speed data buffer store 12 is carried out only when required, when a data item has not yet been loaded in or removed from the high-speed data buffer store 12. In order to disguise the activity of bus interface function blocks by DPA attacks, such as the memory accesses to be detected, especially between the memory 10 and the high-speed data buffer store 12, additional blank read/write processes and/or transmission/reception processes may be produced by the blank bus transmission/reception generator 4".

As in the first exemplary embodiment, it is either possible to interrupt a bus access immediately before physically writing to the register/memory location or to write to an unusable register/memory location 5' in order to avoid any influence on the actual program in this case. This is once again controlled by a control line from the control unit 3 or by additional information that is transmitted on the buses.

The invention has been described above with reference to a blank function generator that produces blank functions in a data processing unit with a 5-stage instruction line. However, the data processing unit may also have a large number of instruction lines or some other type of instruction line. Furthermore, the transmission/reception generator has been described in conjunction with high-speed data/program instruction buffer stores but can, of course, also be operated with buffer stores for control signals and instructions.

I claim:

1. A secure data processing unit, comprising:
    a data/program instruction memory for storing data/program instructions;
    at least one instruction line having a large number of function stages for processing the data/program instructions and connected to said data/program instruction memory;
    a control unit connected to said instruction line for controlling said large number of function stages; and
    a blank function generator for producing blank functions, including blank write processes and other blank processes, and connected to at least one of said control unit, said instruction line and said data/program instruction memory, said blank function generator compensating for said blank write processes only.

2. The secure data processing unit according to claim 1, wherein the blank functions are produced inherently and include blank functions that have no effect on a desired program sequence.

3. The secure data processing unit according to claim 1, wherein said blank function compensator prevents write processes to register/memory locations which can be used by programs.

4. The secure data processing unit according to claim 3, wherein said blank function compensator is a part of said control unit and, for the blank functions, directly prevents write processes in the secure data processing unit.

5. The secure data processing unit according to claim 3, wherein said blank function compensator is a part of said control unit and has register/memory locations which cannot be used by programs, and in which, for the blank functions, write processes in the secure data processing unit are made to said register/memory locations which cannot be used.

6. The secure data processing unit according to claim 1, wherein said blank function generator has a blank instruction generator for producing blank instructions.

7. The secure data processing unit according to claim 6, wherein said blank function generator produces a permissible program instruction.

8. The secure data processing unit according to claim 7, wherein said blank function generator derives a permissible program instruction from the program instructions that are actually processed.

9. The secure data processing unit according to claim 1, wherein said blank function generator has a blank sequence generator for activating at least one additional one of said function stages in said instruction line.

10. The secure data processing unit according to claim 1, further comprising different bus systems for connecting said data/program instruction memory to said instruction line, said data/program instruction memory having bus interface function blocks connected to said different bus systems, and said blank function generator has a blank bus transmission/reception generator for producing additional transmission/reception processes to said bus interface function blocks.

11. The secure data processing unit according to claim 10, wherein said bus interface function blocks have high-speed data/program instruction buffer stores.

12. The secure data processing unit according to claim 1, wherein said blank function generator produces the blank functions one of randomly and deterministically.

13. A method for protecting a data processing unit against external eavesdropping attacks, which comprises the steps of:
    producing blank functions in the data processing unit, including blank write processes and other blank processes;
    executing the blank functions in the data processing unit; and
    compensating only for blank functions that are blank write processes.

14. The method according to claim 13, wherein the compensating step comprises preventing writing processes to register/memory locations which can be used by programs.

15. The method according to claim 14, wherein the compensating step further comprises directly preventing the writing processes in the data processing unit.

16. The method according to claim 14, wherein the compensating step further comprises carrying out, for the blank functions, writing processes in the data processing unit to register/memory locations which cannot be used.

17. The method according to claim 13, wherein the producing step comprises producing blank instructions.

18. The method according to claim 13, which comprises activating additional function stages in an instruction line during the producing step.

19. The method according to claim 13, which comprises producing additional blank bus transmission/reception processes to bus interface function blocks.

20. The method according to claim 13, which comprises producing the blank functions one of randomly and deterministically.

21. A secure data processing unit, comprising:
- a data/program instruction memory for storing data/program instructions;
- at least one instruction line having a large number of function stages for processing the data/program instructions and connected to said data/program instruction memory;
- a control unit connected to said instruction line for controlling said large number of function stages;
- a blank function generator for producing blank functions, including blank write processes and other blank processes, said blank function generator being connected to at least one of said control unit, said instruction line and said data/program instruction memory, said blank function generator operating selectively to compensate for said blank write processes only; and
- said blank function generator compensating for said blank write processes by at least one of:
  (1) rejecting the blank data and program instructions immediately before being written to a register or memory; and
  (2) writing the blank data or program instructions to an unusable memory location.

22. The method of claim 13 further including the step of:
compensating for blank write processes by at least one of:
  (1) rejecting the blank data and program instructions immediately before being written to a register or memory; and
  (2) writing the blank data or program instructions to an unusable memory location.

* * * * *